D. MUNSON.
Lightning Rod.
No. 15,491.
Patented Aug. 5, 1856.
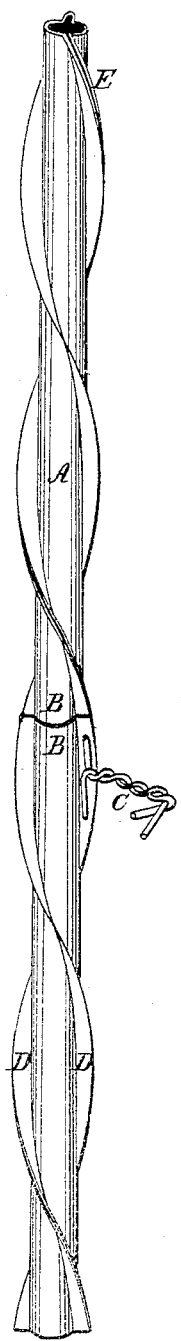

UNITED STATES PATENT OFFICE.

DAVID MUNSON, OF INDIANAPOLIS, INDIANA.

IMPROVEMENT IN LIGHTNING-RODS.

Specification forming part of Letters Patent No. 15,491, dated August 5, 1856.

*To all whom it may concern:*

Be it known that I, DAVID MUNSON, of Indianapolis, in the county of Marion and State of Indiana, have invented a new and Improved Mode of Constructing Lightning-Rods, which I denominate a "tubular lightning-rod with spiral flanges;" and I do hereby declare that the following is a full and exact description thereof, reference being had to the accompanying drawing, and to the letters of reference marked thereon.

My invention has for its object an extra stiffness and durability, as well as an increase of sensibility, to the lightning-rod, presenting a greater amount of surface upon which the electric fluid can act than any other lightning-rod hitherto made, thereby insuring its promptness of action under all circumstances and thereby removing all danger from lightning within a reasonable distance.

In the accompanying drawing my apparatus is represented in perspective.

A is the tube, extending the whole length of each section, and the whole length of the rod when connected, for the admission of the electrical current.

B B are the connecting-joints of each section. These are connected by inserting one tube and its flanges into the other.

C is the fastening-wire, that is put through the two open flanges of each tube and twisted fast.

D D are the spiral flanges of the tube, which present their edges to all points in the atmosphere; E the divided flanges, left open to admit the electric fluid from all points.

It may be worth while to observe that the above-named rod may be manufactured of any good conductor.

What I claim as new, and desire to secure by Letters Patent, is—

Constructing a tubular lightning-rod with spiral flanges, one of which is left open or divided its entire length for the purpose of admitting the electric current to the inner surface of the rod, to diminish its intensity and mechanical effect, substantially as herein described.

DAVID MUNSON.

Attest:
DAVID MACY,
J. S. HARVEY.